United States Patent Office
2,975,067
Patented Mar. 14, 1961

2,975,067
METHOD OF PRESERVING COMESTIBLES
Alexander Winterberg, 3 Ramat Schaul, Haifa, Israel
No Drawing. Filed Feb. 1, 1957, Ser. No. 637,620
7 Claims. (Cl. 99—166)

It is already known to prepare wrapping or enveloping films on certain commodities, especially comestibles, which films are prepared on the basis of synthetic resins. Such plastic films, in many cases, have to withstand the formation of mould, which property is usually imparted to the film by the admixture to the plastic mass of antimycotic substances. It is already known that sorbic acid, being possessed of fungicidal properties, can be used in the preservation and packing of various substances. However, sorbic acid has never been considered suitable to be used for the direct treatment of the surface of comestibles, the said acid being too volatile.

The present invention endeavours to make use of the said fungicidal properties of sorbic acid for use in food processing plants. It is thus an object of the invention to prepare a wrapping film for comestibles to which sorbic acid has been added. It is a further object of the invention to prepare such films on the basis of synthetic resin emulsions. It is another object of the invention to prepare such a film on a polyvinyl acetate basis. It is yet another object of the invention to provide packages of foodstuffs, wrapped in such a film and safeguarding against mould or fungi.

It has been found that the use of sorbic acid in the customary way is impossible. Soluble salts of sorbic acid (and up to about 15% of these salts have to be admixed to the plastic mass) very quickly decompose in the plastic which has a pH of 5–6, and the free sorbic acid is highly volatile, unstable and causes a decomposition of the plastic emulsion. On the other hand pure sorbic acid dissolves difficultly and for this reason cannot be used in solution in the emulsion. The best solvent which would permit the necessary concentration is glacial acetic acid, but this latter would destroy the plastic emulsion, so that it cannot be used.

Most surprisingly it has now been found that a film of plastic material produced on comestibles or like goods can be safeguarded antimycotically for extended periods against decomposition and deterioration by means of sorbic acid, if the said sorbic acid is used neither in solution in acetic acid, nor transformed into alkaline salts, but is added in coarse granules in its pure form to the viscous emulsion from which the film is to be prepared, by being kneaded thereinto prior to the application of the emulsion onto the goods to be protected.

Our tests have shown that undissolved coarsely granulated sorbic acid, added to the plastic emulsion prior to the application thereof, has the same effect in its undissolved state, as it would have in solution, were such possible at all.

Surprisingly the particles of sorbic acid enclosed in the mass have a much longer fungicidal effect as has been the case with solutions of sorbic acid. No other explanation for this astonishing result could be found than that air moisture affects the particles of sorbic acid so as to influence their surroundings antimycotically.

In practice we use plastic emulsions in pasty form, say polyvinyl acetate emulsion, vinyl acetate emulsion or vinylidene chloride emulsion of 5–6 pH. Prior to the application of this mass to the goods to be wrapped therein about 5–15%, but preferably 12%, of coarse granules of sorbic acid are added to this mass and kneaded thereinto. After the formation of the film the granules remain visible in the film and can be detected by feeling with the finger. The particles uniformly distributed in the mass exert a prolonged and strong antimycotic effect, without there being any likelihood of decomposition or volatilising of the sorbic acid. There is also no danger of a deleterious effect of the sorbic acid on the plastic film.

*Example I*

800 parts by weight of a nontoxic polyvinyl acetate emulsion in pasty form
200 parts by weight of water
120 parts sorbic acid The sorbic acid in the form of coarse granules is admixed to the pasty emulsion and is intimately mixed therewith by kneading the granules into the pasty mass. Then the emulsion with its admixture of sorbic acid is applied to the comestibles in the customary manner, the ready package being treated and stored as heretofore.

*Example II*

800 parts by weight of nontoxic vinyl acetate emulsion mixed with a wax emulsion
200 parts by weight of water
120 parts by weight of sorbic acid The vinyl acetate-wax emulsion contains:

500 parts by weight of vinyl acetate, 52% dry matter
30 parts by weight of nontoxic plasticizer
300 parts by weight of wax emulsified 1:1 in water
170 parts by weight of water

*Example III*

800 parts by weight of vinyl acetate emulsion mixed with wax emulsion
200 parts by weight of water
120 parts by weight of sorbic acid The vinyl acetate-wax emulsion contains:

600 parts by weight of vinyl acetate, 52% dry matter
40 parts by weight of a nontoxic plasticizer
150 parts by weight of bees wax
210 parts by weight of water

*Example IV*

920 parts by weight of vinylidene chloride emulsion, 40% dry matter
80 parts by weight of silicone antifoaming substance in aqueous solution (1% dry matter)
12 parts by weight of sorbic acid

*Example V*

920 parts by weight of a mixed polymer of vinylidene chloride and vinyl chloride—70:30
80 parts by weight of a silicone antifoaming substance in aqueous solution, 1% dry matter
12 parts by weight of sorbic acid In Examples II–V the sorbic acid is admixed as described in connection with Example I.

I claim:
1. A method of preserving comestibles, comprising the steps of preparing a viscous aqueous emulsion, in which the dispersed phase is a non-toxic carbon-chain polymerizable plastic, selected from the class consisting of polyvinyl acetate, vinyl acetate mixed with wax, vinylidene chloride, and vinylidene chloride mixed with vinyl chloride, admixing thereto pure sorbic acid in granular form and applying the emulsion to the comestibles to be protected, with original undissolved granules still present in the material in substantially undissolved condition.

2. A method according to claim 1, in which the dispersed phase of the emulsion is a polyvinyl acetate.

3. A method according to claim 1, in which the dispersed phase of the emulsion is intermingled vinyl acetate and wax.

4. A method according to claim 1, in which the dispersed phase of the emulsion is vinylidene chloride.

5. A method according to claim 1, in which the dispersed phase of the emulsion is intermingled vinylidene chloride and vinyl chloride.

6. A method according to claim 1, wherein the emulsion has a pH value of 5–6 and contains between 5–15% of sorbic acid.

7. A method according to claim 1 in which the amount of sorbic acid is 12% by weight.

References Cited in the file of this patent

UNITED STATES PATENTS

| | | |
|---|---|---|
| 1,943,468 | Bridgeman et al. | Jan. 16, 1934 |
| 2,196,164 | Trowbridge et al. | Apr. 2, 1940 |
| 2,213,557 | Tisdale et al. | Sept. 3, 1940 |
| 2,379,294 | Gooding | June 26, 1945 |
| 2,404,519 | Morrison et al. | July 23, 1946 |
| 2,469,914 | Bridgeman | May 10, 1949 |
| 2,524,022 | Rust et al. | Sept. 26, 1950 |
| 2,713,544 | Peters | July 19, 1955 |
| 2,724,650 | Melnick | Nov. 22, 1955 |
| 2,756,154 | Mahaffy | July 24, 1956 |
| 2,858,225 | Gooding | Oct. 28, 1958 |

OTHER REFERENCES

Paper Trade Journal, page 34, July 17, 1953.
Food Technology, pp. 133–135, March 1954.